United States Patent
Hashemi et al.

(10) Patent No.: US 11,416,733 B2
(45) Date of Patent: Aug. 16, 2022

(54) MULTI-TASK RECURRENT NEURAL NETWORKS

(71) Applicant: Google LLC, Mountain View, CA (US)

(72) Inventors: Milad Olia Hashemi, San Francisco, CA (US); Jamie Alexander Smith, Boston, MA (US); Kevin Jordan Swersky, Toronto (CA)

(73) Assignee: Google LLC, Mountain View, CA (US)

(*) Notice: Subject to any disclaimer, the term of this patent is extended or adjusted under 35 U.S.C. 154(b) by 870 days.

(21) Appl. No.: 16/262,785

(22) Filed: Jan. 30, 2019

(65) Prior Publication Data
US 2020/0160150 A1     May 21, 2020

Related U.S. Application Data

(60) Provisional application No. 62/769,512, filed on Nov. 19, 2018.

(51) Int. Cl.
*G06N 3/04*     (2006.01)
*G06N 3/08*     (2006.01)
*G06F 3/06*     (2006.01)

(52) U.S. Cl.
CPC ......... *G06N 3/0445* (2013.01); *G06F 3/0604* (2013.01); *G06F 3/0659* (2013.01); *G06F 3/0673* (2013.01); *G06N 3/08* (2013.01)

(58) Field of Classification Search
None
See application file for complete search history.

(56) References Cited

U.S. PATENT DOCUMENTS

| | | | |
|---|---|---|---|
| 9,336,482 B1 | 5/2016 | Corrado et al. | |
| 9,406,292 B2 | 8/2016 | Tur et al. | |
| 2015/0242322 A1* | 8/2015 | Vajapeyam | G06F 11/3404 |
| | | | 711/119 |

(Continued)

FOREIGN PATENT DOCUMENTS

| | | |
|---|---|---|
| CN | 108780521 | 11/2018 |
| TW | 201636905 | 10/2016 |

(Continued)

OTHER PUBLICATIONS

PCT International Preliminary Report on Patentability in International Application No. PCT/US2019/061780, dated Jun. 3, 2021, 9 pages.

(Continued)

*Primary Examiner* — Ernest Unelus
*Assistant Examiner* — Dayton Lewis-Taylor
(74) *Attorney, Agent, or Firm* — Fish & Richardson P.C.

(57) ABSTRACT

Methods, systems, and apparatus, including computer programs encoded on computer storage media, relating to multi-task recurrent neural networks. One of the methods includes maintaining data specifying, for a recurrent neural network, a separate internal state for each of a plurality of memory regions; receiving a current input; identifying a particular memory region of the memory access address defined by the current input; selecting, from the internal states specified in the maintained data, the internal state for the particular memory region; processing, in accordance with the selected internal state for the particular memory region, the current input in the sequence of inputs using the recurrent neural network to: generate an output, the output defining a probability distribution of a predicted memory access address, and update the selected internal state of the particular memory region; and associating the updated (Continued)

selected internal state with the particular memory region in the maintained data.

19 Claims, 5 Drawing Sheets

(56) References Cited

U.S. PATENT DOCUMENTS

| | | | |
|---|---|---|---|
| 2017/0228642 A1 | 8/2017 | Danihelka et al. | |
| 2017/0372199 A1 | 12/2017 | Hakkani-Tur et al. | |
| 2018/0329883 A1 | 11/2018 | Leidner et al. | |
| 2018/0329982 A1 | 11/2018 | Patel et al. | |
| 2019/0370632 A1* | 12/2019 | Hashemi | G06N 3/084 |
| 2020/0193268 A1* | 6/2020 | Blagodurov | G06N 3/0454 |

FOREIGN PATENT DOCUMENTS

| | | |
|---|---|---|
| TW | 1612488 | 1/2018 |
| WO | WO2017/015390 | 1/2017 |

OTHER PUBLICATIONS

TW Office Action in Taiwan Application No. 108125405, dated Aug. 30, 2021, 12 pages (with English translation).

Bilen et al, "Integrated perception with recurrent multi-task neural networks" arXiv, Jun. 2016, 9 pages.

PCT International Search Report and Written Opinion in International Application No. PCT/US2019/061780, dated Feb. 17, 2020, 16 pages.

Xiao et al, "Multi-task Recurrent Neural Network for Immediacy Prediction" IEEE International Conference on Computer Vision, Dec. 2015, 9 pages.

TW Office Action in Taiwanese Application No. 108125405, dated Feb. 25, 2020, 6 pages with translation.

'tensorflow.org [online]', "Get Started with TensorFlow," available on or before Nov. 11, 2015, via Internet Archive: Wayback Machine URLhttps://web.archive.org/web/20151111070200/https://www.tensorflow.org/tutorials, retrieved on Jun. 22, 2019, URLhttps://www.tensorflow.org/tutorials, 20 pages.

Jiménez, et al. "Dynamic branch prediction with perceptron." IEEE International Symposium on High-Performance Computer Architecture, Jan. 2001, 10 pages.

* cited by examiner

MULTI-TASK RECURRENT NEURAL NETWORKS

CROSS-REFERENCE TO RELATED APPLICATION

This application claims priority to U.S. Provisional Application No. 62/769,512, filed on Nov. 19, 2018. The disclosure of the prior application is considered part of and is incorporated by reference in the disclosure of this application.

BACKGROUND

This specification relates to recurrent neural networks.

Neural networks are machine learning models that employ multiple layers of operations to predict one or more outputs from one or more inputs. Neural networks typically include one or more hidden layers situated between an input layer and an output layer. The output of each hidden layer is used as input to a next layer, e.g., a next hidden layer or the output layer.

Each layer of a neural network specifies one or more transformation operations to be performed on input to the layer. Some neural network layers have operations that are referred to as neurons. Each neuron receives one or more inputs and generates an output that is received by another neural network layer. Often, each neuron receives inputs from other neurons, and each neuron provides an output to one or more other neurons.

Each layer generates one or more outputs using the current values of a set of parameters for the layer. Training a neural network involves continually performing a forward pass on the input, computing gradient values, and updating the current values of the set of parameters for each layer. Once a neural network is trained, the final set of parameters can be used to make predictions in a production system.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step. This allows the recurrent neural network to exhibit dynamic temporal behavior. In other words, the recurrent neural network summarizes all information it has received up to a current time step and is capable of capturing long-term dependencies in sequences of data.

SUMMARY

This specification describes multi-task recurrent neural networks, and more specifically, multi-task recurrent neural networks that improve time-series predictions in microprocessors.

A circuit that implements a multi-task recurrent neural network includes a recurrent neural network cell ("RNN cell") configured to perform operations of a recurrent neural network. That is, the RNN cell is configured to perform transformation operations defined by each layer in the recurrent neural network. The circuit also includes state registers. Each state register is configured to (i) store internal state data for the recurrent neural network and (ii) corresponds to a respective task that the recurrent neural network has been trained to perform. The state data is data that persists across time steps, i.e., data that is maintained after processing one input in a sequence for use in processing a next input in the sequence. For example, if the recurrent neural network is a long short-term memory (LSTM) network, the state data can include, for each LSTM unit in the network, a hidden state $h$ and a cell state $c$.

The circuit receives a current input in a sequence of inputs and sequence identifying data. The circuit identifies a particular task based on the sequence identifying data. The circuit obtains internal state data from the state register corresponding to the identified task. It provides, to the RNN cell, the obtained internal state data and the current input to cause the RNN cell to process the obtained internal state data and the current input to generate a neural network output and updated internal state data for the identified task. The circuit receives from the RNN cell, the neural network output and the updated internal state data for the identified task. Finally, the circuit writes the updated internal state data to the state register corresponding to the identified task.

The circuit described above can be used to more accurately predict memory accesses in a computing system. Specifically, the circuit can: maintain data specifying, for a recurrent neural network that is trained to predict memory access addresses of a computer program in one of several memory regions, a separate internal state for each of the memory regions; receive a current input in a sequence of inputs, the sequence of inputs defining a sequence of prior memory access addresses of the computer program; identify a particular memory region of the memory access address defined by the current input in the sequence of inputs; select, from the internal states specified in the maintained data, the internal state for the particular memory region; process, in accordance with the selected internal state for the particular memory region, the current input in the sequence of inputs using the recurrent neural network to: (i) generate an output, the output defining a probability distribution of a predicted memory access address, the predicted memory access address being a future memory access address of the computer program in the particular memory region, and (ii) update the selected internal state of the particular memory region; and associate the updated selected internal state with the particular memory region in the maintained data.

The subject matter described in this specification can be implemented in particular embodiments so as to realize one or more of the following advantages. By implementing a recurrent neural network in hardware, including storing recurrent neural network states in state registers coupled to the recurrent neural network, the recurrent neural network can perform different tasks in rapid succession, which is known as multi-tasking. More specifically, each state register can store a state for a respective task. The recurrent neural network can obtain a first state from a first state register to process a first input sequence and, before processing of the first input sequence is complete, obtain a second state from a second state register to process a second different input sequence. For example, a single hardware circuit that implements a recurrent neural network can predict memory accesses, cache misses, and branches simply by obtaining a state corresponding to one of those tasks from a respective state register. Storing state data in a state register reduces the number of sequential dependencies that the RNN has to compute at each time step and decreases the total latency by the length of the input sequence.

This specification also describes how input sequences can be categorized and disaggregated by latent cause. In data prefetching, one example of disaggregation by latent cause is separating interleaved streams of memory access addresses in different regions of memory. Each of these regions can have different memory access patterns, and machine learning models can learn more effectively if the streams are separated prior to being used as input to the recurrent neural network. Another example of disaggregation by latent cause in data prefetching is separating streams of memory accesses by the data structures that caused those memory accesses. Again, doing so can cause machine learning models to learn more effectively.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes multi-task recurrent neural networks, and more specifically, multi-task recurrent neural networks that improve time-series predictions in microprocessors.

Figure 1:
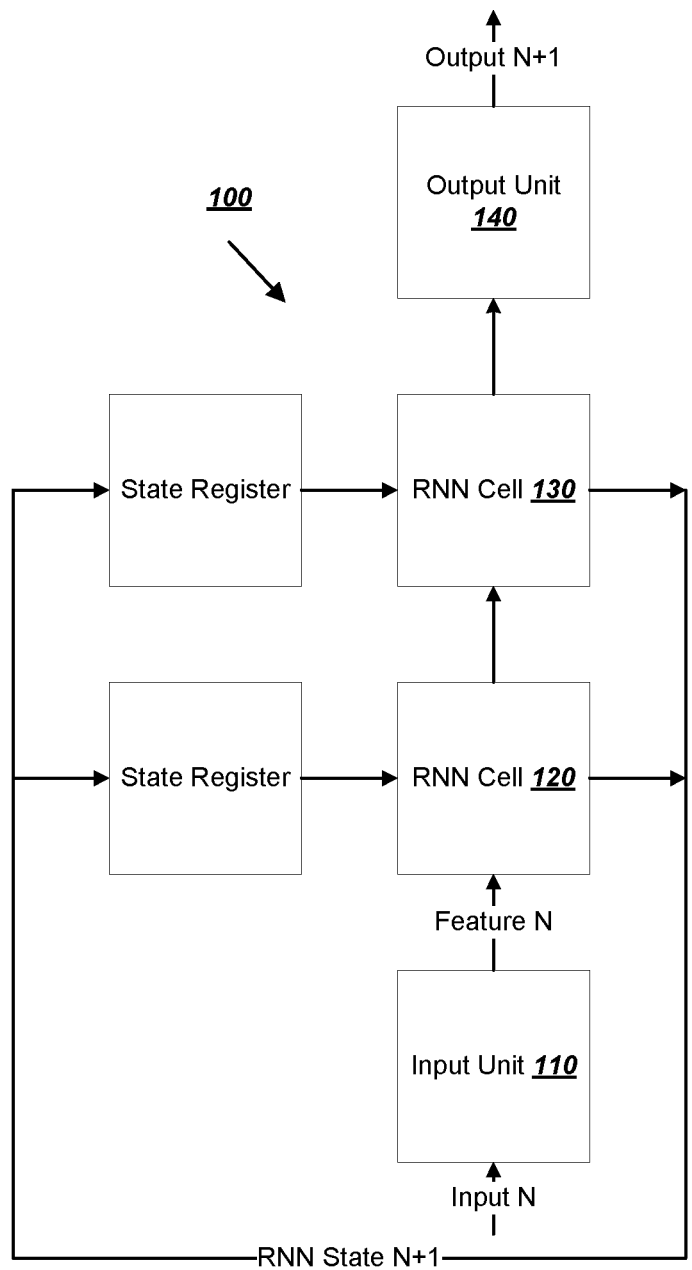
FIG. 1 is a diagram of an example recurrent neural network implemented in hardware.

FIG. 1 is a diagram of a recurrent neural network 100 that is implemented in hardware. Recurrent neural networks generally include an input layer, one or more hidden layers, and an output layer.

The input layer of a recurrent neural network is generally configured to receive a sequence of inputs—including a respective input at each time step from 0 to a current time step N—and process the sequence of inputs to generate a feature representation of the sequence.

The hidden layers of a recurrent neural network are recurrent layers, meaning that they maintain a state between inputs in a sequence and update the current state as part of generating an output for the current time step. Traditional recurrent neural networks have hidden layers that compute an output and a next state for the layer, where the next state is based on the previous state and the current input. The state is maintained across time steps and captures dependencies in the input sequence.

A specific type of recurrent neural network is a long short-term memory (LSTM) network. Hidden layers in LSTM networks include one LSTM unit per input in the input sequence. Each LSTM unit provides an output to another LSTM unit in its own layer and to an LSTM unit in the next hidden layer or output layer. Each LSTM unit includes a hidden state h, a cell state c, an input gate i, a forget gate f, and an output gate o. Each of the three gates can be thought of as individual neurons that compute activations of weighted sums. Intuitively, the input gate controls the extent to which a new value flows into the cell, the forget gate controls the extent to which a value remains in the cell and the output gate controls the extent to which the value in the cell is used to compute the output activation of the LSTM unit. In other words, these gates control what the LSTM unit "remembers," or how its state is influenced by previous states.

The output layer of a recurrent neural network is generally configured to receive input from the last hidden layer and generate an output, e.g., a prediction, at each time step. The output layer can be a soft-max layer, a logistic layer, a linear layer, or the like. Softmax output layers generate discrete probability distributions over possible outputs for the time step. That is, each possible output is associated with a discrete score. Logistic output layers generate parameters, e.g., mean, log scale, or mixture weight, of a distribution over possible outputs for the time step. And linear layers project the output of the last hidden layer into an appropriate output space. In some implementations, recurrent neural networks do not have an output layer, i.e., the output of the last hidden layer is the output of the recurrent neural network.

Training data for a recurrent neural network includes sequences of inputs and labels for those sequences of inputs. Each label corresponds to a desired or expected output at a particular time step for a particular input sequence. Training a recurrent neural network involves setting the weights of the network, e.g., the weights of the input layer, RNN cells, and output layer, to minimize the discrepancy between actual outputs and expected outputs for a given sequence of inputs. If there is a discrepancy between actual outputs and expected outputs for a given sequence of inputs, the weights of the recurrent neural network can be updated, e.g., using a conventional backpropagation through time training technique. Other techniques known in the art can also be used to update the weights of a recurrent neural network.

The recurrent neural network 100 is a hardware implementation of a recurrent neural network that includes one state register per hidden layer and one RNN cell per hidden layer. In some implementations, each RNN cell is a processing unit in a systolic array of processing units. Each processing unit performs matrix multiplication and the other operations of the recurrent neural network layer in hardware, e.g., by including a set of multiply-accumulate units that collectively perform matrix multiplication and other circuitry that applies any necessary gating functions and performs element-wise multiplication.

At a time step N, an input unit 110 receives an input N in a sequence of inputs and generates a feature representation of that input. The RNN cells 120 and 130 process the feature representation using both the fixed parameters of the recurrent neural network and the state data stored in the state registers for each hidden layer. The output of the RNN cell 130 is then provided to an output unit 140, which generates an output for the time step N+1. The RNN cells 120 and 130 also update the state data in their respective state registers to reflect the input N. This state data captures all previous inputs and states.

Figure 2:
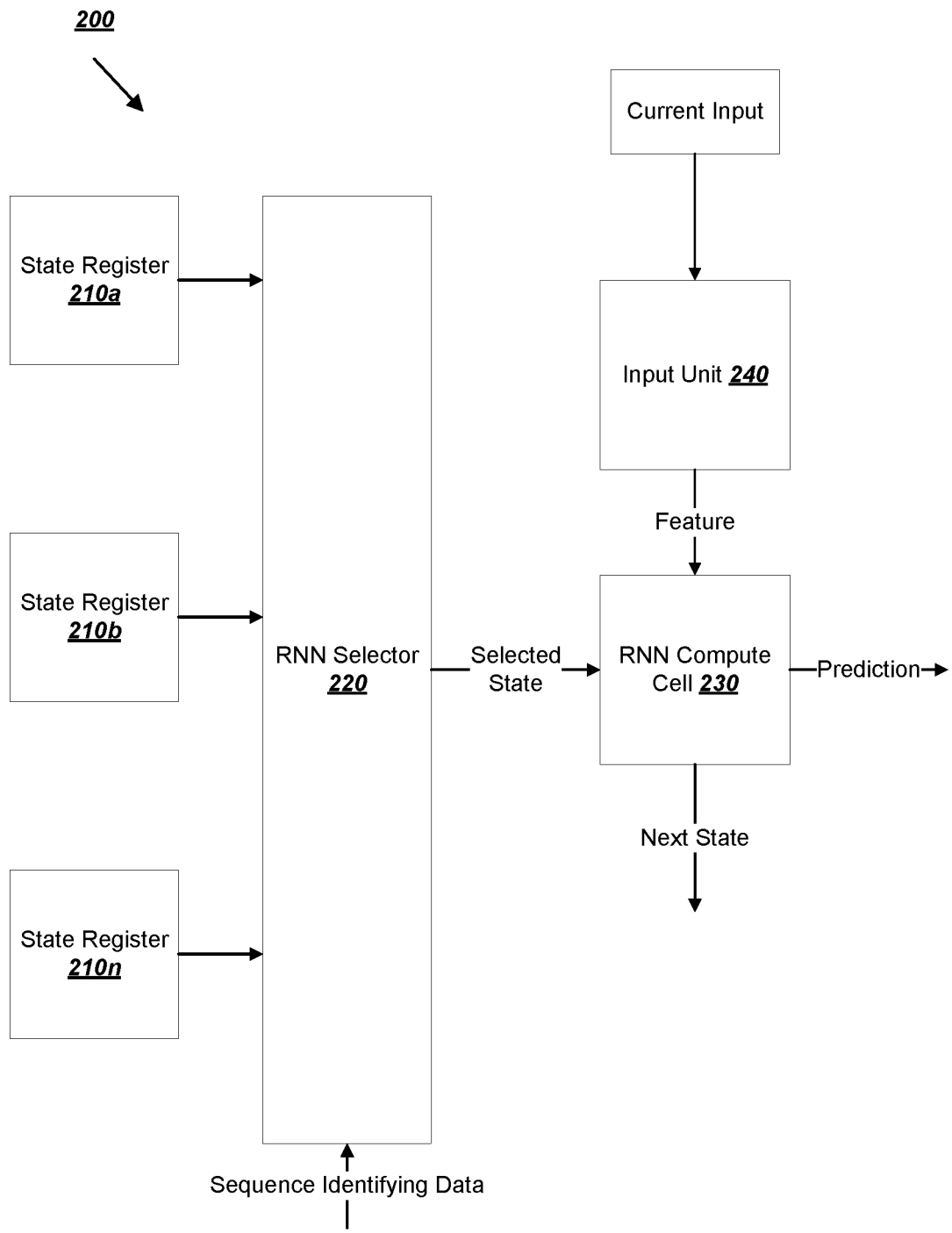
FIG. 2 is a diagram of an example recurrent neural network system with state registers and a multiplexor.

FIG. 2 is a diagram of an example recurrent neural network system 200 that utilizes state registers in a different way. The state registers 210a-210n can each store data specifying a different internal state of a recurrent neural network. Each internal state and consequently, each state register, corresponds to a respective different task that the neural network has been trained to perform. For example, a first state register can store data specifying an internal state that corresponds to predicting memory access addresses, i.e., load and store addresses, while a second state register can store data specifying an internal state that corresponds to predicting computer program branches. Other state registers, meanwhile, can store data specifying internal states that correspond to predicting future program instructions or cache misses, for example.

An RNN selector 220, which is a multiplexor, can select, based on sequence identifying data, the particular internal state that the recurrent neural network uses at a particular time. The sequence identifying data specifies the state register—and consequently, the internal state—that should be loaded into the RNN compute cell 230. The sequence identifying data can be based on a user input that specifies a particular task that the RNN compute cell 230 should perform, e.g., predict memory access addresses (as opposed to branches, program instructions, or cache misses). Alternatively, the sequence identifying data can be based on an observation about the current input. For example, the sequence identifying data can be based on an observation that the current input is a cache address. In such a circumstance, the sequence identifying data might specify that the internal state corresponding to the task of predicting cache misses should be loaded into the RNN compute cell 230.

The recurrent neural network system 200 also includes an input unit 240 that is loaded with a set of fixed parameters. The input unit 240 can receive the current input, generate a feature representation of the current input, and provide the feature representation to the RNN compute cell 230.

Using the selected state, the feature representation, and a set of fixed weights maintained in the RNN compute cell 230, the RNN compute cell 230 can generate a prediction and a next state for the task. If the recurrent neural network has multiple hidden layers, the RNN compute cell 230 can provide the generated prediction to another RNN compute cell, which would have its own state registers and RNN selector. Also, the recurrent neural network system can optionally include an output unit. Meanwhile, the RNN compute cell 230 can provide the next state for the task to the appropriate state register 210*a*-210*n*, overwriting the previous state of that register. Training a multi-task recurrent neural network like the one described above requires training the recurrent neural network to perform each task.

Alternatively, the state registers 210*a*-210*n* can each store data specifying, for a recurrent neural network that is trained to predict memory access addresses of a computer program in a plurality of memory regions, a separate internal state for each of the plurality of memory regions. Disaggregating memory accesses by memory region in this way can improve memory access predictions because memory accesses within a single memory region generally follow a more predictable pattern than memory accesses across two or more memory regions. That is, the RNN compute cell 230 generates more accurate predictions when it predicts memory accesses in a particular memory region rather than across the entire address space.

Figure 3:
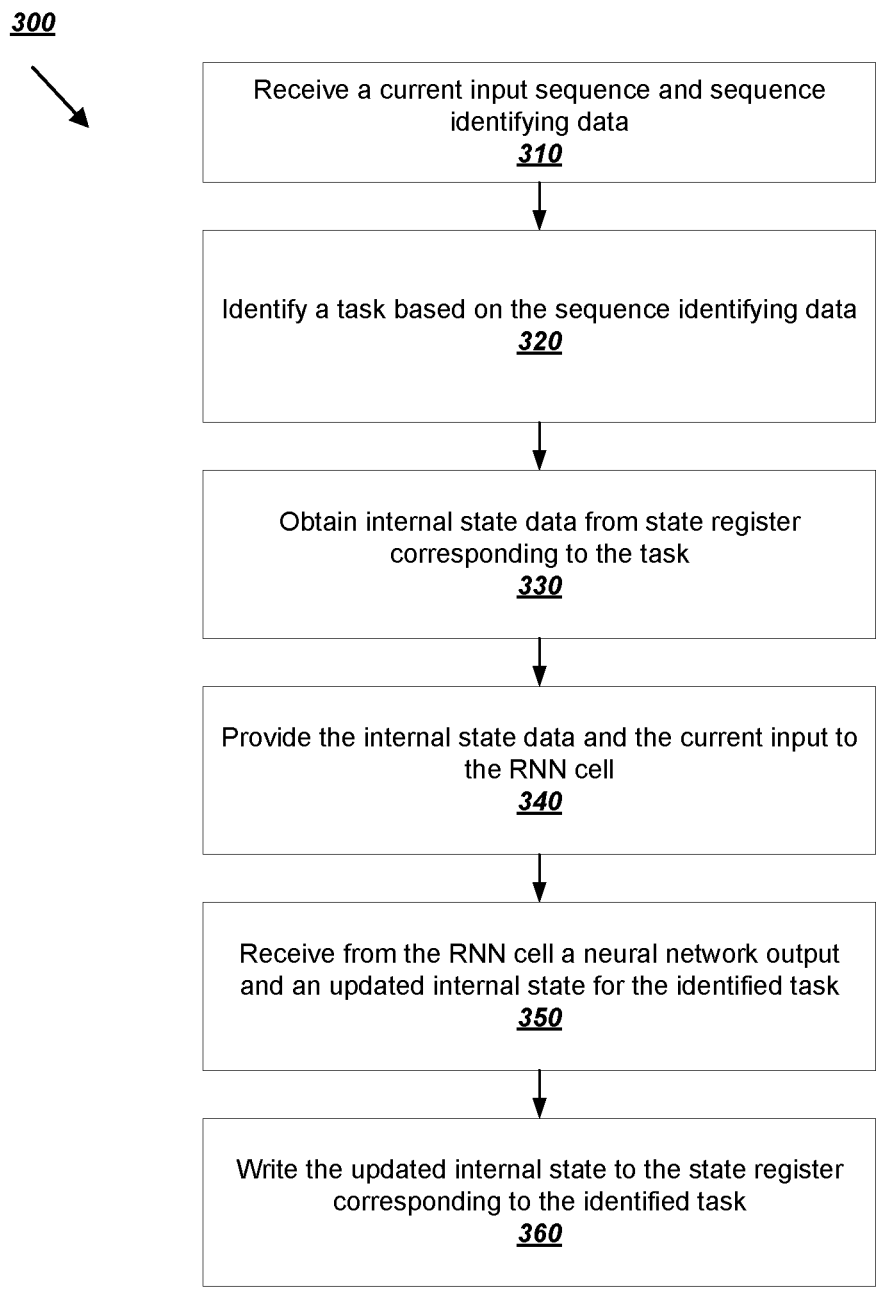
FIG. 3 is a flow chart of an example process for processing multi-task recurrent neural networks using a hardware circuit.

FIG. 3 is a flow chart of an example process 300 for processing multi-task recurrent neural networks. The process 300 is performed by an appropriately programmed circuit. The circuit includes an RNN cell that is configured to perform operations of a recurrent neural network, a number of state registers, and other circuitry. Each state register is (i) configured to store internal state data for the recurrent neural network and (ii) corresponds to a respective task of a number of tasks that the neural network has been trained to perform.

The circuit receives a current input in a sequence of inputs and sequence identifying data (310). The input sequence includes a respective input at each of number of time steps. The time steps may or may not be consecutive. The sequence identifying data specifies the task—and consequently, the state register—from which internal state data be loaded into the RNN cell.

The circuit identifies a particular task to be performed based on the sequence identifying data (320). The sequence identifying data can be based on a user input that specifies a particular task that the RNN cell should perform, e.g., predict memory access addresses (as opposed to branches, program instructions, or cache misses). Alternatively, the sequence identifying data can be based on an observation about the current input. For example, the sequence identifying data can be based on an observation that the current input is a cache address. In such a circumstance, the sequence identifying data might specify that the internal state corresponding to the task of predicting cache misses should be loaded into the RNN cell.

The circuit obtains internal state data from the state register corresponding to the identified task (330). The circuit provides the obtained internal state data and the current input to the RNN cell to cause the RNN cell to process the obtained internal state data and the current input to generate a neural network output and updated internal state data for the identified task (340).

The circuit receives, from the RNN cell, the neural network output and the updated internal state data for the identified task (350). Finally, the circuit writes the updated internal state data to the state register corresponding to the identified task (360).

The example recurrent neural networks described in reference to FIG. 1 and FIG. 2 and the example process described in reference to FIG. 3 can be used to predict future memory access addresses in a computing system.

Computer programs cause a computing system to operate on data stored in various memory locations in the computing system. Generally, the computing system must load data from main memory or local cache into local registers before it can operate on that data. But loading data from main memory is particularly slow because, generally, main memory is large and physically far from the local registers. So computer programs that routinely cause computing systems to retrieve data from main memory execute more slowly than computer programs that do not. By pre-fetching data from main memory and storing it in faster local cache before it is needed, computing systems can reduce the run time of computer programs. Recurrent neural networks can be used to predict data that should be pre-fetched.

Figure 4:
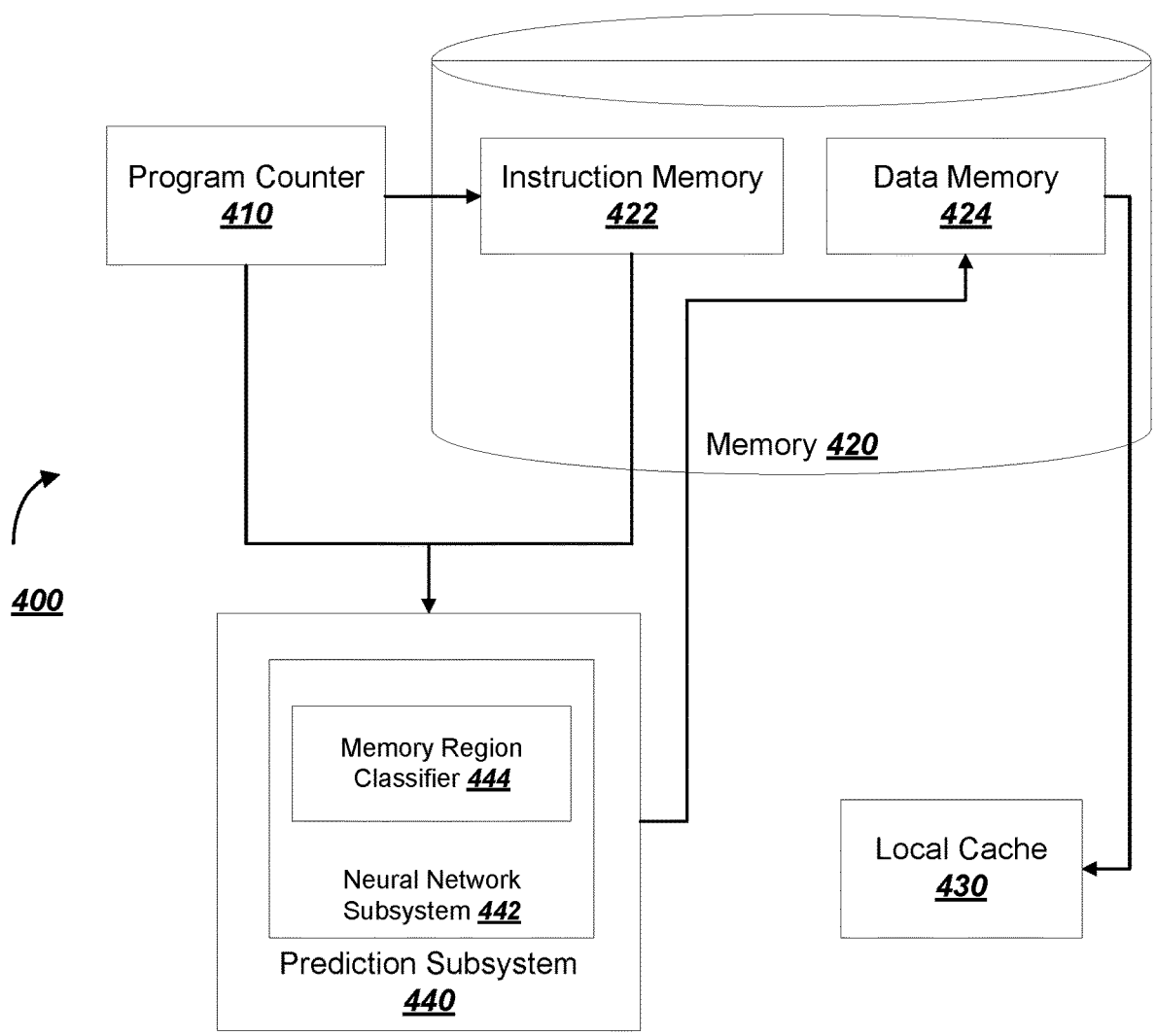
FIG. 4 is a diagram of an example computing system that is configured to pre-fetch data from memory.

FIG. 4 is a diagram of an example computing system 400 that is configured to pre-fetch data from memory and to store that data in local cache. The computing system 400 can execute computer program instructions using one or more processors that are not pictured. In particular, the computing system 400 can store computer program instructions in instruction memory and then execute the instructions in an order defined by the computer program.

The computing system 400 has a program counter 410. A program counter, i.e., an instruction address register, is a register that stores a value that points to a next computer program instruction to be executed. That is, the program counter 410 stores a memory address where the next computer program instruction to be executed is stored.

When an instruction cycle begins, the computing system 400 retrieves the next computer program instruction from the address specified by the program counter 410. The address that is stored in the program counter 410 corresponds to a location in an instruction memory 422, which is a block of memory in memory 420.

Typically, a given computer program instruction specifies an operation, e.g., load, store, add, subtract, nor, branch, etc., one or more source registers, and a destination register. The computing system 400 performs the specified operation on the data stored in the source registers and stores the result in the destination register. For example, a computer program instruction might specify that data stored in register A should be added to data stored in register B and that the result should be stored in register C.

Generally, computing systems have a limited number of local registers, so data to be operated on is loaded into those local registers only when it is needed. But fetching data from memory is time-consuming and slows execution of computer programs. One solution to this problem is predicting data that will be operated on in the future, pre-fetching that data, and storing it in faster local memory such as a local cache 430. Fetching data from local cache is faster than fetching data from main memory because local cache is in general both physically closer to the system than main memory and smaller than main memory.

But because local cache is also of limited size, the computing system can store only a small subset of main memory in local cache at any given time. Consequently, the computing system 400 can advantageously predict a subset of future memory access addresses and store data from those addresses in local cache. If the computing system makes accurate predictions, the computing system can execute the computer program instructions faster.

A prediction subsystem 440 of the computing system 400 is configured to receive sequences of prior program counter addresses and corresponding memory access addresses and to predict future memory access addresses. The prediction subsystem 40 includes a neural network subsystem 442. The neural network subsystem 442 can be the recurrent neural network system described in reference to FIG. 2. The neural network subsystem 442 includes, in addition to the components described in reference to FIG. 2, a memory region classifier 444 that is configured to determine, from among a number of memory regions, the particular memory region of each memory access. Separating memory accesses by memory region can improve memory access predictions because memory accesses within a single memory region generally follow a more predictable pattern than memory accesses across two or more memory regions. The significance of partitioning memory into regions will be described in more detail in reference to FIG. 5.

The prediction subsystem 440 can be implemented on the same computer on which the computer program is executed, or it can be implemented on a different computer.

After the prediction subsystem 440 predicts a particular memory access address, the computing system 400 pre-fetches data from that address and stores it in the local cache 430. The prediction subsystem 440 continues to predict memory access addresses—and the computing system 400 continues to pre-fetch data from those addresses—as the computer program is executed. It is faster to fetch data from the local cache 430 than it is to fetch data from the data memory 424. This results in faster execution of computer programs by the computing system 400.

Although this specification primarily describes data pre-fetching, the recurrent neural network systems described herein can be configured to make other time-series predictions in microprocessors. For example, the systems can be used to pre-fetch instructions from instruction memory.

The systems can also be used to optimize memory disambiguation. Memory disambiguation is a set of techniques employed by computing systems that execute memory access instructions out of order. The techniques detect or predict dependencies between memory operations to increase memory access efficiency and speed.

The recurrent neural network systems described herein can also be used to optimize cache replacement policies. Because cache is of limited size, when a computing system places data into cache, it must generally remove a corresponding amount of data from the cache. Recurrent neural network systems can predict the best data, e.g., the data least likely to be used by the computing system in the near future, to remove from the cache. Alternatively, recurrent neural network systems can predict the data that is most likely to be used in the near future and ensure that that data remains in the cache. For example, in a "least recently used" cache, i.e., in a cache that has a replacement policy that specifies that the least recently used data in the cache should be removed in favor of new data, the systems can update an "age bit" for data that is predicted to be used in the near future. Updating the age bit ensures that the data will not be replaced with new data.

Figure 5:
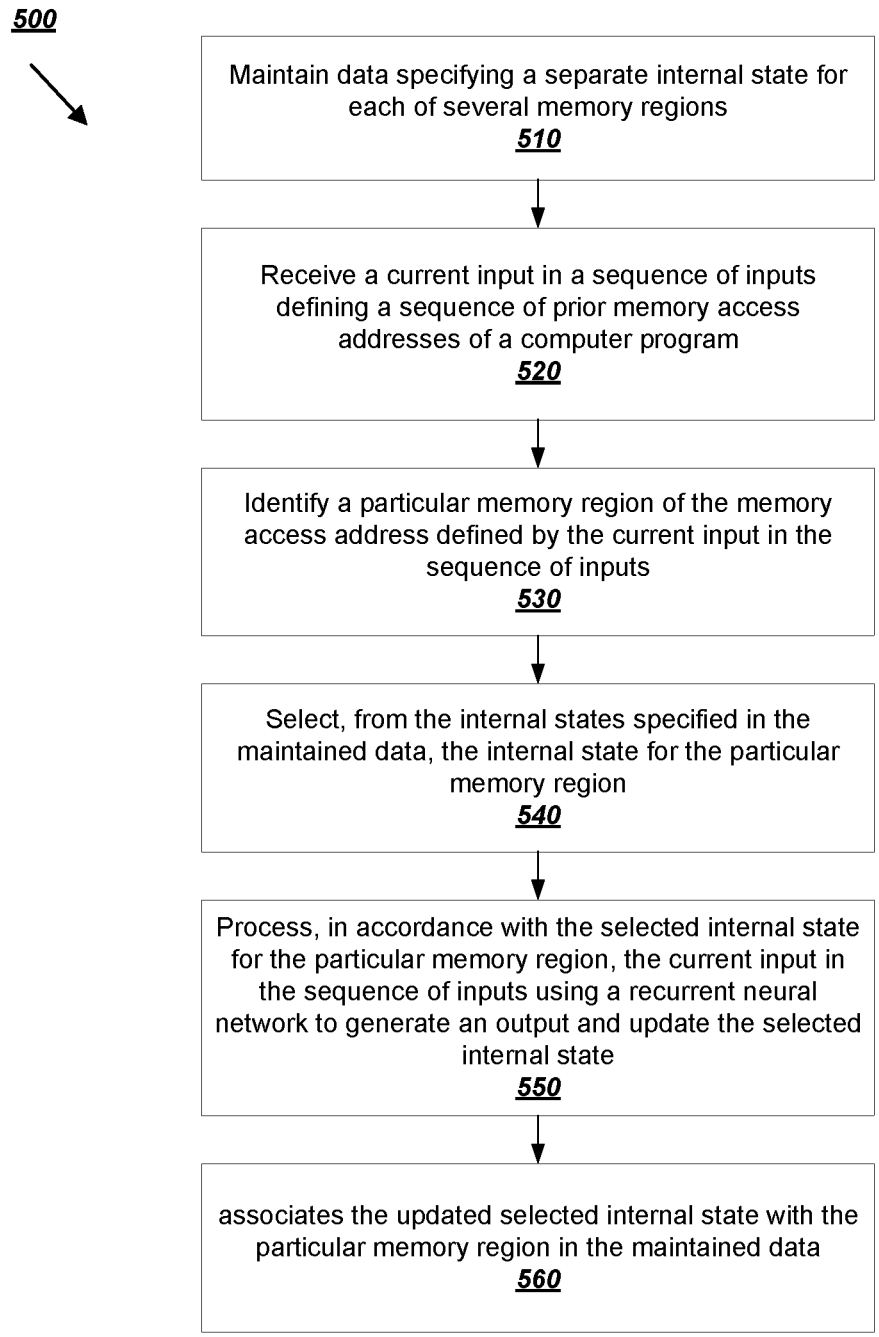
FIG. 5 is a flow chart of an example process for predicting future memory access addresses of a computer program executing in a computing system.

FIG. 5 is a flow chart of an example process 500 for predicting future memory access addresses of a computer program executing in a computing system. The recurrent neural network system described in reference to FIG. 2 can perform the example process 500. Alternatively, the process 500 can be implemented in software. For convenience, the process 500 will be described as being performed by an appropriately programmed system of one or more computers in one or more locations.

The system maintains data specifying, for a recurrent neural network that is trained to predict memory access addresses of a computer program in a several memory regions, a separate internal state for each of the several memory regions (510).

The system receives a current input in a sequence of inputs defining a sequence of prior memory access addresses of a computer program (520). The sequence of inputs can be a sequence of prior program counters addresses and corresponding delta values. Each delta value defines a difference between a respective first memory access address and a respective second memory access address. The first memory access address is a memory address that was accessed when an instruction pointed to by the corresponding program counter address was executed. For example, a particular program counter address can point to a memory address storing an instruction that, when executed, fetches data from memory. In such a case, the memory address of that data is the first memory access address. The second memory access address is a memory address that was accessed prior to the first memory address being accessed. Each prior memory access address is an address in one of several memory regions in main memory of the computing system. The system can determine memory regions by identifying the memory pages that the memory accesses touch. Alternatively, the system can determine memory regions by applying a clustering algorithm, e.g., the k-means clustering algorithm, to the memory accesses.

In some implementations, the system generates an input representation of the current input. For example, in implementations in which the current input is a program counter address and a delta value, the system can then map the program counter address and delta value to a numeric embedding in a high dimensional space, which serves as the input representation. The embedding is high-dimensional, real-valued vector.

The system can generate the embedding using a lookup table generated by a trained neural network. For example, the program counter address and delta value pair can be mapped to an index, and the index can be used to lookup the embedding in the lookup table. Alternatively, the system can generate the embedding by providing the program counter address and delta value directly to the trained neural network.

The system identifies a particular memory region of the memory access address defined by the current input in the sequence of inputs (530).

The system selects, from the internal states specified in the maintained data, the internal state for the particular memory region (540).

The system processes, in accordance with the selected internal state for the particular memory region, the current input in the sequence of inputs using the recurrent neural network to generate an output and update the selected internal state (550). The output defines a probability distribution of a predicted memory access address. The predicted memory access address is a future memory access address of the computer program in the particular memory region.

The system can set a threshold criterion and determine if any of the probabilities in the distribution meet that threshold criterion. For example, the threshold criterion can be a probability of 0.5, i.e., a 50% chance that a particular memory address will be a future memory access address, i.e., that the computer program will cause the computing system to access data in the memory address. The system can adjust the threshold criterion dynamically. For example, the system can set a higher threshold when memory bandwidth utilization is high and set a lower threshold when the memory bandwidth utilization is low.

In response to determining that a particular probability in the probability distribution does meet the threshold criterion, the system can fetch data from the memory address associated with that probability and store that data in a local cache. In some cases, the system may determine that multiple probabilities meet the threshold criterion and pre-fetch data from the multiple memory addresses associated with those probabilities. Doing so increases the likelihood that the correct data is pre-fetched. This reduces the run time of the computer program executing on the computing system.

The system is generally configured to predict a next memory access address in the identified memory region. However, it is possible to train the recurrent neural network to predict memory access addresses that are farther in the future. For example, the recurrent neural network can be trained to predict a second-to-next (N+2), fourth-to-next (N+4), or eighth-to-next (N+8) memory access address in the identified memory region. The recurrent neural network can be trained to predict a second-to-next memory access address, for example, by providing to the recurrent neural network delta values that each are calculated using a memory access address at a time step N and a memory access address at a time step N−2, as opposed to sequential memory access addresses.

In some implementations, instead of pre-fetching data as described above, the system can insert a fetch instruction into the computer program. Execution of the fetch instruction causes data to be fetched from a future memory address associated with a probability that meets the threshold criterion. The fetch instruction must be inserted into the computer program prior to the future instruction of the computer program that would otherwise cause the data to be fetched from memory. In this way, the data that the future instruction needs will already be in local cache when the future instruction is executed. Execution of the future instruction will then result in a cache hit instead of a cache miss, and the system will not need to fetch data from memory. This makes the computer program run faster, since fetching data from memory is time-intensive. The system can insert more than one fetch instruction into the computer program if more than one probability meets the threshold criterion.

In some implementations, the system provides additional features to the recurrent neural network. For example, the system can provide an indication of whether the most recent memory access was a load or a store. The system can also provide to the recurrent neural network the current cache occupancy. The current cache occupancy can affect the threshold criterion as described above.

Finally, the system associates the updated selected internal state with the particular memory region in the maintained data (560).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers.

The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
   maintaining data specifying, for a recurrent neural network that is trained to predict memory access addresses of a computer program in a plurality of memory regions, a separate internal state for each of the plurality of memory regions;
   receiving a current input in a sequence of inputs, the sequence of inputs defining a sequence of prior memory access addresses of the computer program;
   identifying a particular memory region of the memory access address defined by the current input in the sequence of inputs;
   selecting, from the internal states specified in the maintained data, the internal state for the particular memory region;

processing, in accordance with the selected internal state for the particular memory region, the current input in the sequence of inputs using the recurrent neural network to:
- generate an output, the output defining a probability distribution of a predicted memory access address, the predicted memory access address being a future memory access address of the computer program in the particular memory region, and
- update the selected internal state of the particular memory region; and associating the updated selected internal state with the particular memory region in the maintained data.

2. The method of claim 1, wherein the predicted memory access address is a next memory access address of the computer program in the particular memory region.

3. The method of claim 1, wherein the sequence of inputs comprises a sequence of prior program counter addresses of the computer program and corresponding delta values, wherein each delta value defines a difference between a respective first memory access address and a respective second memory access address, wherein the first memory access address is an address that was accessed when an instruction pointed to by the corresponding program counter address was executed, and wherein the second memory access address is an address that was accessed prior to the first memory address being accessed.

4. The method of claim 3, wherein the first memory access address and the second memory access address are in a same memory region of the plurality of memory regions.

5. The method of claim 1, wherein a memory access associated with the predicted memory access address is a read access.

6. The method of claim 5, further comprising:
- determining that one or more probabilities in the distribution meet a threshold criterion;
- in response, fetching data from the one or more predicted memory access addresses associated with the one or more probabilities that meet the criterion; and
- storing the data in local cache.

7. The method of claim 5, further comprising:
- determining that one or more probabilities in the distribution meet a threshold criterion; and
- automatically inserting one or more pre-fetch instructions into the computer program, wherein execution of the one or more pre-fetch instructions causes data to be fetched from the one or more predicted memory access addresses associated with the one or more probabilities that meet the criterion, wherein the one or more pre-fetch instructions are inserted into the computer program prior to an instruction that causes the predicted memory access.

8. A circuit comprising:
- a recurrent neural network cell (RNN cell) configured to perform operations of a recurrent neural network;
- a plurality of state registers, wherein each state register is configured to (i) store internal state data for the recurrent neural network and (ii) corresponds to a respective task of a plurality of tasks that the neural network has been trained to perform; and
- circuitry configured to perform operations comprising:
  - receiving a current input in a sequence of inputs and sequence identifying data,
  - identifying a task of the plurality of tasks based on the sequence identifying data,
  - obtaining internal state data from the state register corresponding to the identified task,
  - providing, to the RNN cell, the obtained internal state data and the current input to cause the RNN cell to process the obtained internal state data and the current input to generate a neural network output and updated internal state data for the identified task,
  - receiving, from the RNN cell, the neural network output and the updated internal state data for the identified task, and
  - writing the updated internal state data to the state register corresponding to the identified task.

9. The circuit of claim 8, wherein the sequence identifying data is based on a property of the current input.

10. The circuit of claim 8, wherein the sequence identifying data is based on a user input.

11. The circuit of claim 8, wherein the RNN cell is configured to main a set of fixed weights of the recurrent neural network.

12. The circuit of claim 8, wherein the circuitry comprises a multiplexor configured to:
- select, based on the sequence identifying data, the state register corresponding to the identified task; and
- provide, to the RNN cell, the obtained internal state data.

13. A system comprising one or more computers and one or more storage devices storing instructions that when executed by one or more computers cause the one or more computers to perform operations comprising:
- maintaining data specifying, for a recurrent neural network that is trained to predict memory access addresses of a computer program in a plurality of memory regions, a separate internal state for each of the plurality of memory regions;
- receiving a current input in a sequence of inputs, the sequence of inputs defining a sequence of prior memory access addresses of the computer program;
- identifying a particular memory region of the memory access address defined by the current input in the sequence of inputs;
- selecting, from the internal states specified in the maintained data, the internal state for the particular memory region;
- processing, in accordance with the selected internal state for the particular memory region, the current input in the sequence of inputs using the recurrent neural network to:
  - generate an output, the output defining a probability distribution of a predicted memory access address, the predicted memory access address being a future memory access address of the computer program in the particular memory region, and
  - update the selected internal state of the particular memory region; and
- associating the updated selected internal state with the particular memory region in the maintained data.

14. The system of claim 13, wherein the predicted memory access address is a next memory access address of the computer program in the particular memory region.

15. The system of claim 13, wherein the sequence of inputs comprises a sequence of prior program counter addresses of the computer program and corresponding delta values, wherein each delta value defines a difference between a respective first memory access address and a respective second memory access address, wherein the first memory access address is an address that was accessed when an instruction pointed to by the corresponding program counter address was executed, and wherein the second memory access address is an address that was accessed prior to the first memory address being accessed.

16. The system of claim 15, wherein the first memory access address and the second memory access address are in a same memory region of the plurality of memory regions.

17. The system of claim 13, wherein a memory access associated with the predicted memory access address is a read access.

18. The system of claim 17, the operations further comprising:
- determining that one or more probabilities in the distribution meet a threshold criterion;
- in response, fetching data from the one or more predicted memory access addresses associated with the one or more probabilities that meet the criterion; and
- storing the data in local cache.

19. The system of claim 18, the operations further comprising:
- determining that one or more probabilities in the distribution meet a threshold criterion; and
- automatically inserting one or more pre-fetch instructions into the computer program, wherein execution of the one or more pre-fetch instructions causes data to be fetched from the one or more predicted memory access addresses associated with the one or more probabilities that meet the criterion, wherein the one or more pre-fetch instructions are inserted into the computer program prior to an instruction that causes the predicted memory access.

* * * * *